Jan. 29, 1946. F. KOWALSKI, JR 2,393,641
TANK CARRIER
Filed Feb. 18, 1943 2 Sheets-Sheet 1
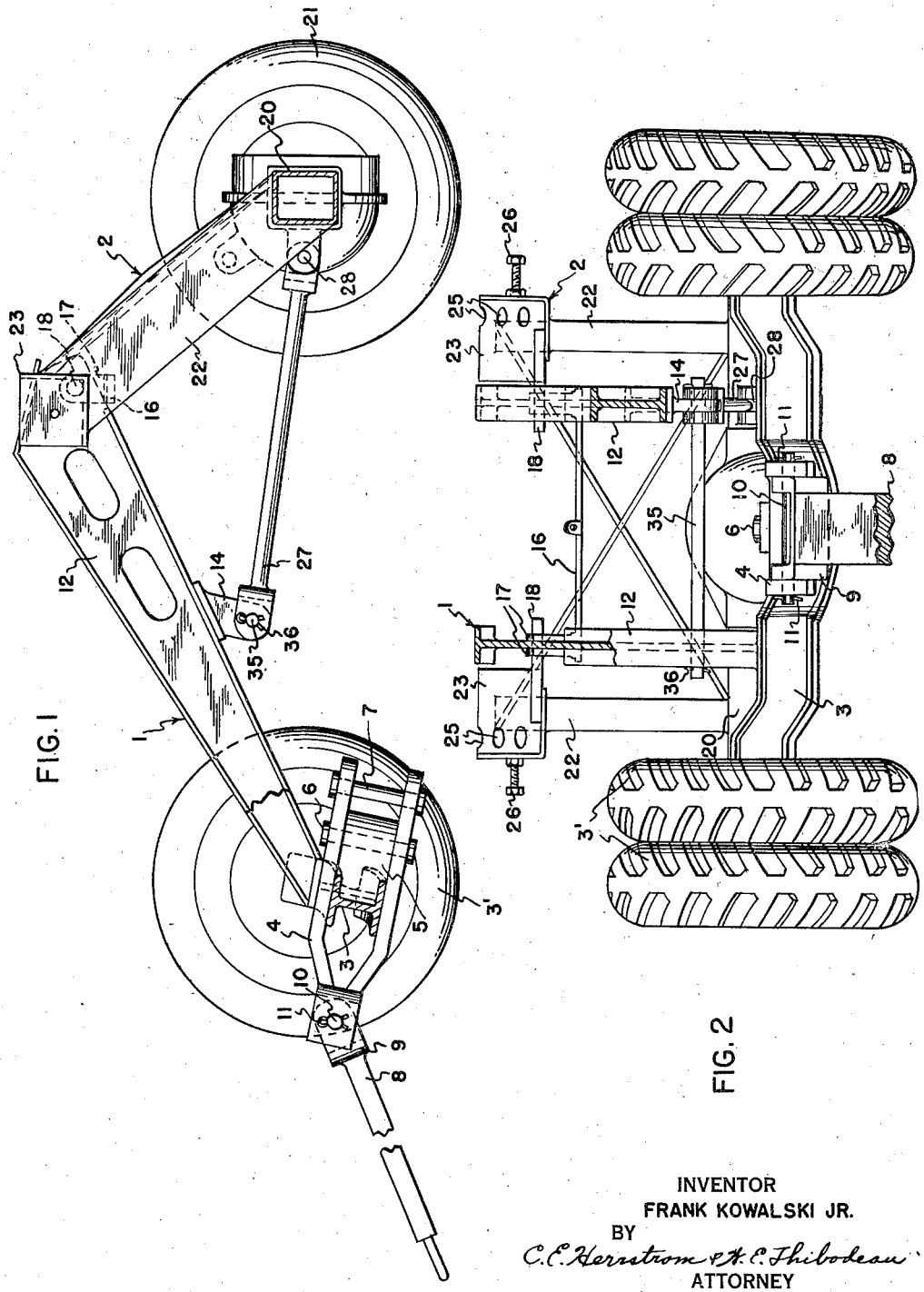
INVENTOR
FRANK KOWALSKI JR.
BY
C. E. Herrstrom & H. E. Thibodeau
ATTORNEY

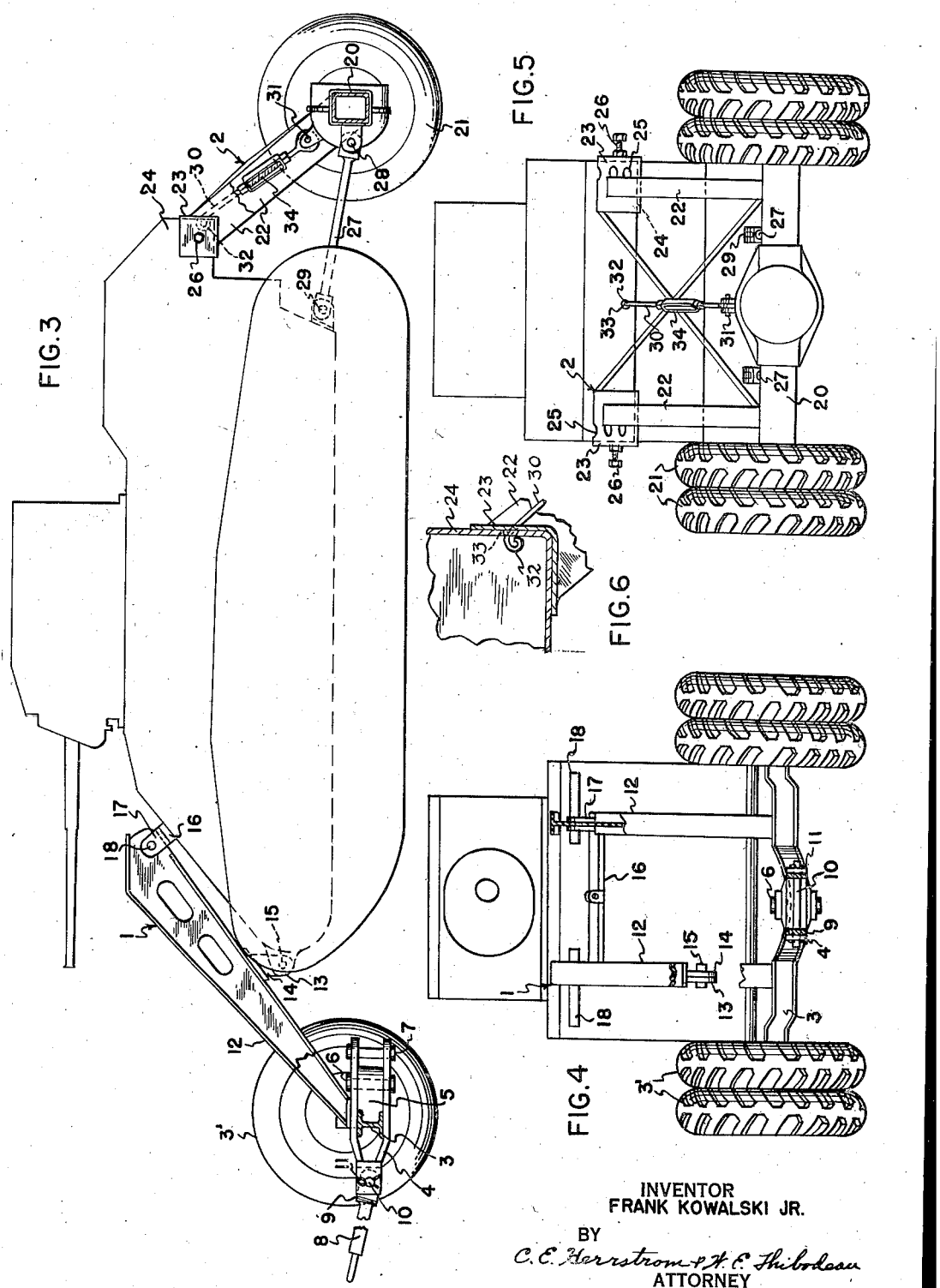

Patented Jan. 29, 1946

2,393,641

UNITED STATES PATENT OFFICE 2,393,641

TANK CARRIER

Frank Kowalski, Jr., Freda, Calif.

Application February 18, 1943, Serial No. 476,301

1 Claim. (Cl. 280—29)

(Granted under the act of March 3, 1883, as amended April 30, 1928; 370 O. G. 757)

The invention described herein may be manufactured and used by or for the Government for governmental purposes, without the payment to me of any royalty thereon.

The present invention pertains to a novel device for mounting a heavy load, such as a combat tank, on wheels. Inasmuch as the device is intended primarily for this purpose, the invention is herein designated as a tank carrier and described as such, but the invention is nevertheless applicable for the transportation of other heavy loads.

The conventional tank carrier which is at present employed by the armies of the United Nations and the enemy is a low multi-wheeled type of trailer. The difficulty of moving a disabled heavy tank on to a trailer is obvious.

The primary object of this invention is to provide an apparatus which greatly facilitates the operation of lifting the tank off the ground and mounting it on wheels. The invention includes essentially a forward carrier unit and a rear carrier unit, each comprising a wheeled axle with a supporting structure thereon. These structures are suitably fastened respectively to the forward and rear ends of the tank, after the tank has been elevated off the ground by suitable means. The manner of attachment of the tank to the supporting structures is such that the tank remains in its elevated position.

Another important property of the invention is that the two units may conveniently be attached to one another, without load, to form a small and compact vehicle which can be readily towed to the disabled tank. Thereupon, the units are separated and the tank is suspended between them and towed away.

Another object of the invention resides in providing a carrier requiring no modification of the conventional tank structure in suspending the tank from the carrier.

The invention is fully disclosed by way of example in the following description and in the accompanying drawings in which Figure 1 is a side elevation of the carrier, with parts in section, assembled in condition to be moved to a dismantled tank;

Figure 2 is a front elevation thereof, with parts in section;

Figure 3 is a side elevation of a tank supported by the carrier, with parts of the latter in section;

Figure 4 is a corresponding front elevation with parts in section;

Figure 5 is a corresponding rear elevation with parts in section, and

Figure 6 is a detail of the rear mounting of the tank.

Reference to these views will now be made by use of like characters which are employed to designate corresponding parts throughout.

The carrier, shown in Figure 1, consists of a front unit 1 and a rear unit 2 fastened together to form a wheeled vehicle that can easily be moved to the disabled tank. The units are then separated and applied respectively to the forward and rear ends of the tank, as will presently be described in detail.

The forward unit comprises a wheeled axle 3 carrying tires 3' of suitable size and number, according to the weight of the tank to be carried. A fork 4 is slipped on the center of the axle and attached to a block 5 behind the axle by means of a pin 6. Another pin 7 may be passed through the fork, behind the block 5, to make the assembly more secure. To the forward end of the fork 4 is attached a draft bar 8 by means of a fork 9, horizontal pin 10 and suitable fastenings 11 at the ends of the pin.

Beyond the axle 3, the load carrying structure includes a pair of struts 12 fixed to the axle and extending upwardly therefrom. A two-point attachment of each strut to the tank will support a portion of the tank weight with the proper distribution of stresses and without excessive strain at the union of the struts with the axle. One of the two points of attachment occurs at each of the ears 13 at the forward end of the tank. A similar ear 14 depending from each strut alines with an ear 13, and the two are connected by a suitable pin 15 passed through there. At the upper end of the structure, a horizontal stop bar 16 is suspended from the struts by means of lugs 17 pivotally attached thereto by means of elongated pins 18 as shown more clearly in Figure 4.

The rear carrier unit similarly includes a conventional or other suitable wheeled rear axle 20 carrying tires 21 of suitable size and number. Likewise, a pair of struts 22 are fixed to the axle and extend upwardly therefrom. The upper end of each strut is formed with a seat 23 adapted to receive an end of the ledge 24 on the rear end of the tank. The seats are formed with openings 25 to accommodate the rivets on the tank body. This structure is tightened to prevent lateral slipping of the tank by means of set screws 26 mounted in the sides of the seats and engaging the corresponding sides of the tank body.

The rear unit is attached more positively to the tank body by a pair of heavy links 27 each having one end hinged to the rear axle at 28 and the other end hinged to the rear end of the tank body at 29. Further attachment is made by means of the extensible link 30 shown in Figures 3 and 5. One end thereof is pivoted to the center of the axle at 31, and the other end is hooked at 32 and inserted in a hole 33 that normally is formed in the rear end wall of the tank body. A turnbuckle 34 is inserted in the link for proper length adjustment. When the apparatus has been set up and connected in this manner, it will be seen that links 27 and 30 together with the rear wall of the tank hull constitute a rigid triangular frame, whereby the rear end of the tank may be supported in the elevated position shown in Figure 3. In order to raise the ends of the tank off the ground, a suitable jack is employed.

One of the important features of the invention is that the carrier without load may be assembled in the form of a light vehicle, as shown in Figure 1, in which condition it is transported to the disabled tank. In this condition the adjustable link 30 is preferably removed and may be carried by the towing vehicle. The links 27 have their forward ends attached respectively to the lugs 14 by means of a rod 35 and cotter pins 36. Also, cotter pins may be passed through the connecting pins 15 and 18 as desired. The bar 16 drops to its lowest position and permits the upper ends of the struts 12 to rest thereon. The links 27 obviously prevent separation at this point.

Each unit may be equipped with suitable air brakes and spring suspension, if required.

To summarize the manner in which the device is used, the assembled carrier is towed to the scene in the condition shown in Figures 1 and 2. The units thereof are then separated and applied to the ends of the tank in the manner described after the tank has been slightly elevated. The tank itself provides the chassis between the two axles.

Although specific embodiments of the invention have been illustrated and described, it will be understood that various alterations in the details on construction may be made without departing from the scope of the invention as indicated by the appended claim.

What I claim is:

In combination with a tank vehicle having a plurality of apertured lugs fore and aft thereof, a carrier therefor comprising forward and after wheeled axles, parallel spaced supporting frame members extending angularly upwardly and rearwardly from said forward wheeled axle at an acute angle to a plane through the axes of said axles, a depending lug disposed centrally between the ends of each of said frame members, pivotal means carried by the upper ends of said frame members for engaging the forward part of said vehicle, said depending lugs on said frame members engaging said lugs on said vehicle, parallel support members on said after wheeled axle and extending upwardly and forwardly therefrom at an acute angle to the plane of the axes of said axles, seats on the upper part of said after frame members for receiving a rearward projection of said vehicle, and link members connecting said after wheeled axle and the lower part of said vehicle, the top portions of said upwardly extending frame members on said forward and after wheeled axles and said link members and the depending lugs on said frame members on the forward wheeled axles being adapted to be connected together for over-land transportation thereof in the form of a four-wheeled vehicle.

FRANK KOWALSKI, Jr.